United States Patent
Harding

[19]

[11] Patent Number: 5,901,457
[45] Date of Patent: May 11, 1999

[54] CHAIN SAW RULER ATTACHMENT

[76] Inventor: James M. Harding, 45 Brooklyn St., P.O. Box 63, Angelica, N.Y. 14709

[21] Appl. No.: 08/901,012

[22] Filed: Jul. 28, 1997

[51] Int. Cl.[6] .............................. G01B 3/02; B27B 17/00
[52] U.S. Cl. .................................. 33/630; 33/499; 33/809; 30/383
[58] Field of Search .............................. 33/464, 465, 466, 33/484, 485, 495, 496, 497, 498, 499, 500, 630, 640, 809, 833; 30/383; 403/84, 91, 101, 103

[56] References Cited

U.S. PATENT DOCUMENTS

| | | | |
|---|---|---|---|
| 1,885,384 | 11/1932 | Snow | 403/101 |
| 1,907,459 | 5/1933 | Stowell | 33/495 |
| 2,765,007 | 10/1956 | Hoffmann | 33/630 |
| 3,276,490 | 10/1966 | Johansson | 30/383 |
| 3,364,580 | 1/1968 | Lucia | 33/630 |
| 3,531,870 | 10/1970 | Romancky | 33/809 |
| 4,185,382 | 1/1980 | Rawlinson, Jr. | 30/383 |
| 4,233,739 | 11/1980 | Hinrichs | 33/630 |
| 4,275,504 | 1/1981 | Chontos | 30/383 |
| 4,299,034 | 11/1981 | DeBetta | 33/630 |
| 4,341,018 | 7/1982 | Nelson et al. | 30/383 |
| 4,377,910 | 3/1983 | Landry, Jr. | 30/383 |
| 4,388,762 | 6/1983 | Debell, Jr. et al. | 33/630 |
| 4,446,627 | 5/1984 | Persson | 33/497 |
| 4,545,122 | 10/1985 | Durfee, Jr. | 30/383 |
| 4,561,186 | 12/1985 | Keefe | 33/630 |
| 4,951,398 | 8/1990 | Bennett et al. | 33/630 |

FOREIGN PATENT DOCUMENTS

| | | | |
|---|---|---|---|
| 518643 | 11/1955 | Canada | 33/809 |
| 2630369 | 10/1989 | France | 30/383 |
| 199588 | 11/1965 | Sweden | 33/630 |
| 495985 | 11/1938 | United Kingdom | 33/809 |

*Primary Examiner*—G. Bradley Bennett
*Attorney, Agent, or Firm*—James C. Simmons

[57] ABSTRACT

A ruler attachment device for a chain saw. The device includes a ruler telescopingly received in a tubular member so that it may be compactly stowed when not in use. The tubular member is attached to a bracket, which is attached to the chain saw housing, so as to pivot between a first position in which the tubular member is normal to the chain saw housing for measuring length of wood being cut and a second position in which the tubular member may be compactly, quickly, and easily stowed out of the way alongside the chain saw housing without removing the attachment from the chain saw, yet be easily and quickly pivoted back to the first position to be put back into use.

20 Claims, 3 Drawing Sheets

CHAIN SAW RULER ATTACHMENT

The present invention relates generally to ruler devices. More particularly, the present invention relates to a ruler attachment for a chain saw for measuring the length of wood being cut therewith.

For economical reasons, it is considered desirable to be able to cut firewood to precise lengths. Otherwise, the purchaser may get more or less than was bargained for. However, individually measuring with a separate ruler or measuring stick is inconvenient and time consuming. In order to easily and conveniently and without waste of time insure that precise lengths of firewood are cut, it is considered desirable that a ruler attachment be attached to a chain saw 10.

Various ruler attachments for chain saws are proposed in U.S. Pat. Nos. 4,951,398; 4,545,122; 4,561,186; 4,377,910; 4,341,018; 4,185,382; and 4,275,504.

U.S. Pat. No. 4,545,122 to Durfee, Jr. discloses a chain saw gauging attachment adapted to be received under an existing nut on an existing stud of a chain saw. A rod extends outwardly from the fitting and is firmly attached thereto. An indicator is slidably affixed to the rod. The fitting is provided with a rotating means which permits the gauging attachment to be swung to the rear of the chain saw and away from the working area when not in use. When mounted, the gauge rod extends along the length of a log which is to be cut, and the indicator enables the user to fix by sight the place on the log where the next cut is to be made. The gauge rod is described as slender and resilient whereby it will spring back to its original shape if accidentally flexed. However, such a flexible gauge rod may unsafely be thrown into the chain, and the gauging attachment inconveniently cannot be placed in a compact form when the chain saw is not in use.

U.S. Pat. No. 4,951,398 to Bennett et al discloses a measuring and guiding attachment which has a swing arm assembly mounted on a front handle bar of a chain saw and a caliper plate which is movably attached to the distal end of the swing arm assembly. The swing arm assembly is very complex and includes joints which allow relative movements between parts which is described as allowing several degrees of freedom whereby cuts in a workpiece that are angled with respect to each other can be easily made yet can be stored in an out-of-the-way location and can still be easily deployed. The swing arm is telescopically received in a collar so that it can be extended into a deployed condition from a stored condition and can be extended to a length necessary to define the desired spacing between cuts. The collar supports the caliper plate. Measuring marks are provided on the swing arm assembly. This attachment is complicated and expensive to manufacture Moreover, it would undoubtedly require frequent cleaning to prevent its becoming clogged and incapacitated due to sawdust and the like. Furthermore, it may be difficult to securely and safely attach it to the handlebar, and its attachment to the handlebar may undesirably interfere with its use. Also, the handle bars of some chain saws, such as the one illustrated in the drawing of the present application, may be located so that attachment to the handle bar does not position the attachment suitably for making a measurement or at least would require that a caliper plate be provided to extend to the piece being cut.

The attachments disclosed in the other patents also suffer from disadvantages including being unsafe, inconvenient to use, complicated, expensive to manufacture, and inaccurate.

It is accordingly an object of the present invention to provide a chain saw ruler attachment which is easy to use and may be compactly, easily, and quickly stowed out of the way when not being used, yet may be easily and quickly put back into use.

It is another object of the present invention to provide such an attachment which is safe, uncomplicated, and not susceptible to becoming incapacitated due to sawdust and the like, easy to install and take off, and inexpensive to manufacture.

In accordance with the present invention, an attachment is provided which comprises a tubular member in which a ruler is telescopingly received. The tubular member is pivotally attached to a bracket which is mountable to the chain saw housing for movement between a first position for use and a second position for stowage alongside the chain saw housing.

The above and other objects, features and advantages of the present invention will be apparent in the following detailed description of a preferred embodiment thereof when read in conjunction with the accompanying drawings wherein the same reference numerals denote the same or similar parts throughout the several views.

DETAILED DESCRIPTION OF THE PREFERRED EMBODIMENT

Figure 1:
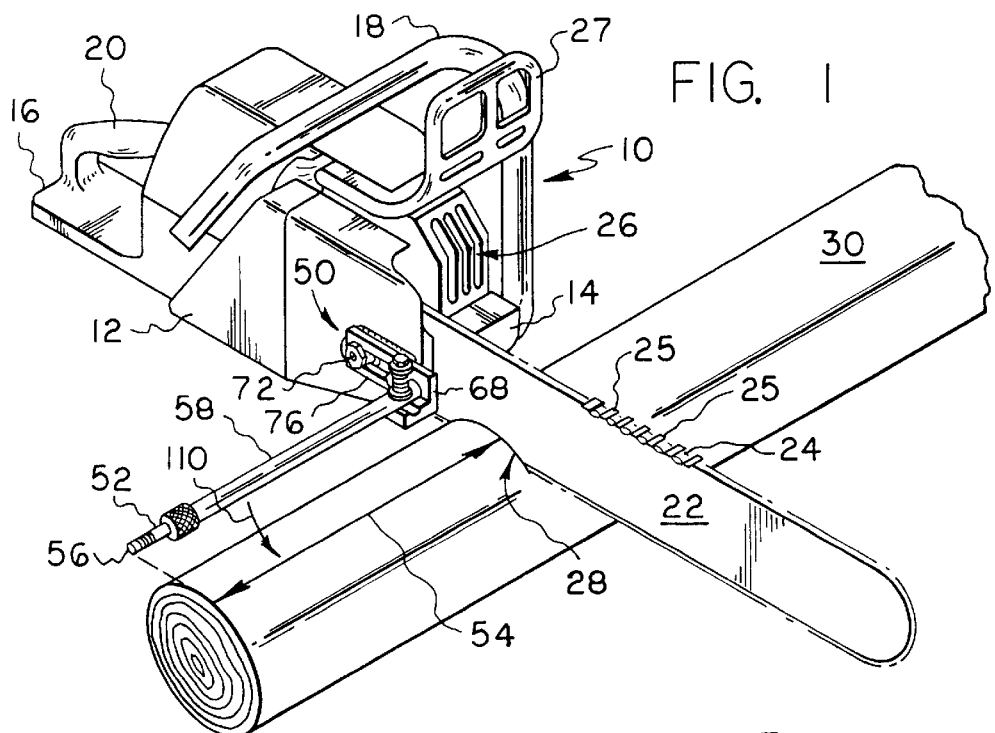
FIG. 1 is a perspective view of a chain saw with an attachment which embodies the present invention attached thereto and illustrated in use.

Referring to the drawings, there is illustrated generally at 10 a conventional chain saw having a housing 12 with a forward end 14 and a rearward end 16. Handles 18 and 20 are provided at the forward end 14 and the rearward end 16 respectively. A guide bar 22 is attached to the forward end 14 and extends forwardly therefrom. A chain 24 extends around the perimeter of the guide bar in a manner well known to those of ordinary skill in the art and is driven by a motor, illustrated at 26, within the housing 12. Suitable cutters, illustrated at 25, are mounted on the chain 24. A safety guard is illustrated at 27. When the chain saw is in operation, the rotation of the chain 24 around the guide bar perimeter effects movement of the cutters 25 to cut as illustrated at 28 through a log, illustrated at 30, or the like. Such a chain saw and its operation are well know in the art and will therefore not be described further herein except as it applies to the present invention.

For economical reasons, it is considered desirable to be able to cut firewood to precise lengths. Otherwise, the purchaser may get more or less than was bargained for. However, individually measuring with a separate ruler or measuring stick is inconvenient and time consuming. In order to easily and conveniently and without waste of time insure that precise lengths of firewood are cut, a ruler attachment, illustrated generally at 50, is attached to the chain saw 10.

The ruler attachment device 50 is attached, as hereinafter described, to the housing 12 at the forward end 14 thereof where it may be conveniently positioned so that, during cutting, the ruler, illustrated at 52, may be closely adjacent the piece of wood 30 being cut, as seen in FIG. 1, for easy yet precise measurement thereof, as illustrated at 54, without having to lay down the chain saw 10 or otherwise consume time in making the measurement. Thus, measurement is to the terminal or distal end, illustrated at 56, of the ruler 52, and its position is such that, conveniently, a caliper plate extending from the end 56 to the log 30 is not required. However, such a caliper plate or the like may be provided, if desired.

Figure 4:
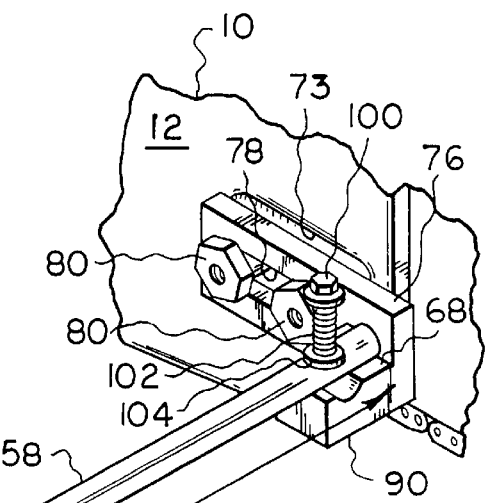
FIG. 4 is an enlarged perspective view of the attachment with the ruler extended to a desired length of measurement and illustrating its connection to the chain saw housing.

In order to advantageously provide compactness of the attachment 50 for stowage, in accordance with the present invention, the ruler 52 comprises an elongate rod which is telescopically received, as hereinafter discussed, within tubular member 58. Thus, FIG. 1 illustrates the ruler 52 compactly completely received within the tubular member 58 with just a small portion at the terminal end 56 sticking out. The length 54 therefore represents the minimum length that can be measured with the attachment 50. FIG. 4 illustrates the ruler 52 extended or pulled out for a maximum length of measurement. As seen in FIG. 4, ruler 52 has periodic markings, illustrated at 60, along its length. For example, the ruler 52 may have three markings 60 at distances or increments, illustrated at 62, of 2 inches apart, and the tubular member may have a length, illustrated at 64, of about 9 inches thereby allowing firewood measurements between about 12 inches and 18 inches. The terminal end portion (which sticks out in the compact position) of the ruler 52 has a plurality of circumferential grooves, illustrated at 66, thereon for providing traction for a person grasping the ruler to extend it.

Figure 2:
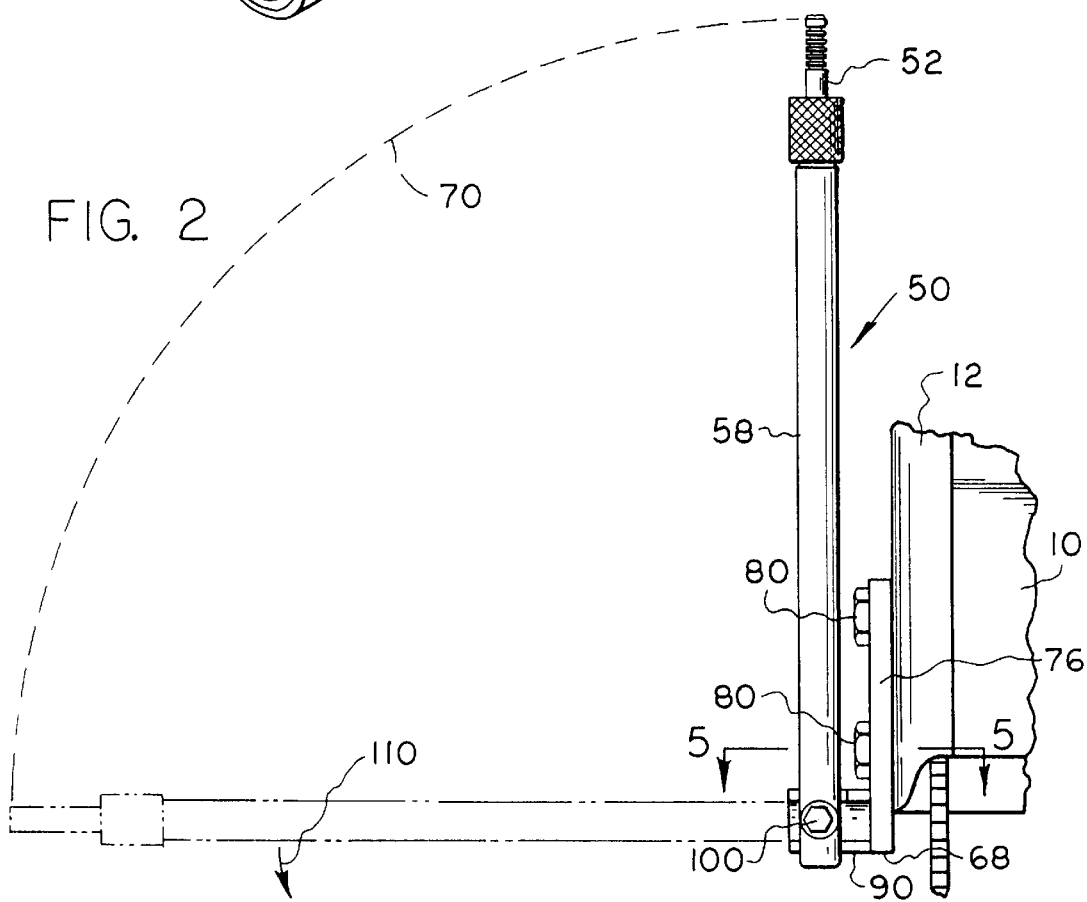
FIG. 2 is a partial enlarged top view thereof with the attachment in a stowed position and illustrating in phantom lines its use position.

In order to advantageously move tubular member 58, with the ruler 52 compactly received telescopingly therein, quickly and easily out of the way for laying the chain saw 10 down, in accordance with the present invention, the tubular member 58 is pivotally mounted to a bracket 68 which is in turn fixedly attached to the chain saw housing 12. Thus, FIG. 2 illustrates, in solid lines, the tubular member 58 pivoted, as illustrated at 70, to lie parallel to and closely alongside the housing 12 so that it as well as the ruler 52 is out of the way. FIG. 2 further illustrates, in phantom lines, the tubular member 58 pivoted so that, for use, it is generally normal to the housing 12, i.e., it extends outwardly from the housing in a direction which is generally perpendicular to the longitudinal direction of the guide bar 22. Thus, the tubular member 58 is pivoted through about 90 degrees between these two positions. The ruler 52 may therefore be easily and quickly and compactly stowed when the chain saw is not in use without the necessity of detaching the ruler from the chain saw.

In accordance with a preferred embodiment of the present invention, the bracket 68 is advantageously easily and quickly attached to the chain saw housing 12 using a pair of studs 72 which are part of the chain saw assembly. These studs 72 are commonly used in chain saws to firmly attach the guide bar 22 to the housing, and nuts are commonly applied to the ends of these studs for this purpose. Moreover, a well or recess 73 is commonly provided in the housing 12 around these studs so that the studs and nuts applied thereto do not protrude beyond the plane of the housing.

The bracket 68 includes a planar generally rectangular portion 76 which is sized to overlie and extend beyond the recess 73 at its ends. Thus, for example, the bracket 68 as well as the tubular member 58 and the ruler 52 may be composed of aluminum, and the portion 76 may, for example, have a thickness of about ¼ inch and a length and width of about 3¼ inches and 1¼ inch respectively. The portion 76 has an elongate longitudinally-extending slot, illustrated at 78, therethrough which is sized so that the studs 72, if longer than they actually are, would be received therein at opposite ends respectively thereof. Thus, for example, the slot 78, which may be located midway between the sides of portion 76, may have a length and width of about 2 inches and ½ inch respectively and may be rounded at the ends.

The studs 72 (typically for a chain saw) terminate in the recess 73 and do not extend beyond the plane of the housing 12 and therefore do not extend into the slot 78. In order to attach the bracket 68 to the housing 12, a pair of nuts 80 are provided which have threaded apertures 82 extending therethrough and which have shank portions 84 which are sized to pass through the slot 78 and threadedly engage the studs 72. The nuts 80 also have heads 86, which may be hex-shaped or otherwise suitably shaped for receiving a wrench and which are sized so that they cannot pass through the slot 78. For example, the shank portions 84 may have a diameter and length which are each about ⁷⁄₁₆ inch.

Washers 88 are disposed in the recess 73 to act as spacers between the bottom of the recess and portion 76, and the shank portions 84 are received within the washers 88. The washers 88 are sized so that the portion 76 bears against the washers 88 rather than the housing and so that the portion 76 is tightly pinched between the washers 88 and the nut heads 86 thereby to effect secure attachment, without play, of the bracket 68 to the chain saw 10. However, the sizing of the washers 88 is also such that the spacing between the portion 76 and the housing 12 is minimized. For example, the washers 88 may have a thickness of about ¼ inch (or slightly more than the depth of recess 73) and inner and outer diameters of about ½ inch and 1 inch respectively. The provision of two nuts engaging the two studs desirably prevents the bracket 68 from twisting. It should be understood that the means and sizing for attaching the bracket 68 to the housing 12 will vary depending on the particular construction of a chain saw.

Extending outwardly (in a direction away from the chain saw) from the forward end portion of the planar portion 76 is a portion 90 which is generally in the shape of a block, the slot 78 being rearwardly relative to the block. The block 90 is disposed generally on the bottom half of the portion 76 and with its bottom and forward surfaces co-planar with the bottom and forward surfaces respectively of the portion 76. For example, the block 90 may have a height, width, and length (distance which it extends outwardly from portion) of about ½ inch, ¾ inch, and 1 inch respectively. The inner end portion of the tubular member 58 rests on top of the block 90.

Figure 3:
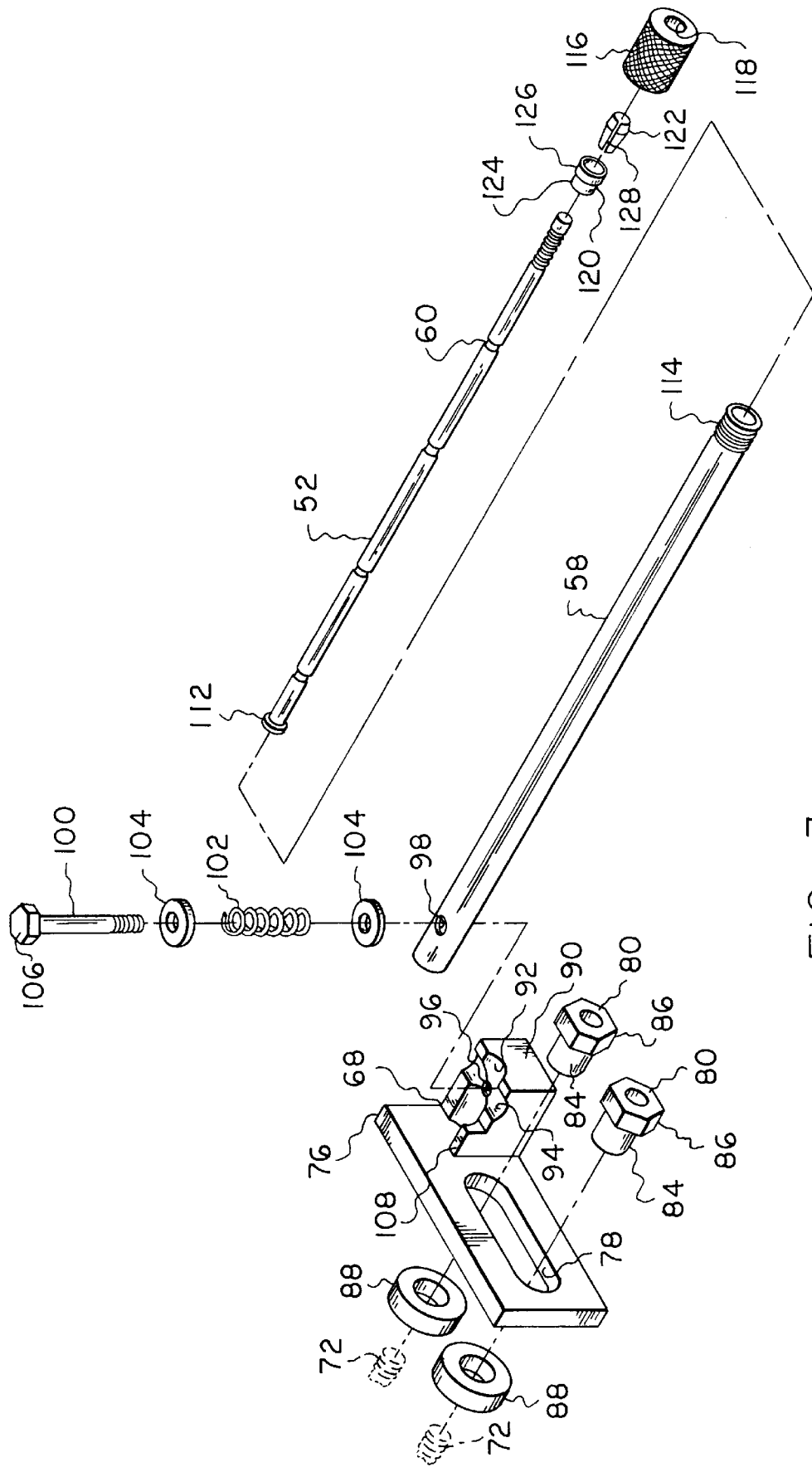
FIG. 3 is an exploded view of the attachment.
Figure 5:
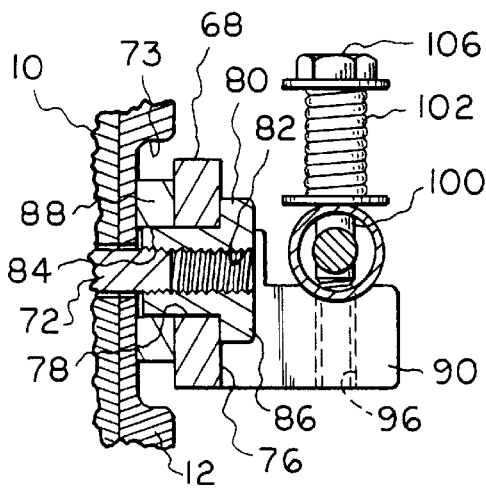
FIG. 5 is a sectional view taken along lines 5—5 of FIG. 2.

As best seen in FIG. 3, the block 90 has two shallow arcuate grooves, illustrated at 92 and 94 respectively, in its upper surface. These grooves extend perpendicular to each other, one groove 92 extending in a direction general normal to the planar portion 76 and to the housing 12, and the other groove 94 extending generally parallel to the planar portion 76 and to the housing 12. Groove 92 is generally mid-way between the forward and rear sides of the block 90. Groove 94 is located closer to the outer side of the block 90 than to the planar portion 76. The grooves 92 and 94 are sized to nest the tubular member 58 therein. For example, each groove has a depth and width of about ¹⁄₁₆ inch and ¼ inch respectively, and groove 94 may be located distances from the outer side of the block and the portion 76 of about ³⁄₁₆ inch and ⁷⁄₁₆ inch respectively.

A threaded aperture 96 extends vertically through the block 90, and its center is at the intersection of the longitudinal axes of the grooves 92 and 94. An aperture 98 is defined by individual aligned apertures formed through the walls of the tubular member 58. When the tubular member 58 is nested in groove 92 with its end spaced only slightly from portion 76 (but enough, for example, less than about 1/16 inch, so that it does not impinge the portion 76 when it is turned about the center of aperture 96), the apertures 96 and 98 are positioned to be aligned. When the tubular member 58 is nested in groove 92, it extends normal to the portion 76 and to the housing 12 for use, as seen in FIGS. 1 and 4. When the tubular member 58 is nested in groove 94, it extends parallel to and closely alongside the housing 12 in a stowed position, as seen in solid lines in FIG. 2.

A screw 100 is received in aperture 98 and threadedly received in aperture 96 and extends for a distance, for example, about 7/8 inch, above the tubular member 58. The upper portion of the screw 100 above the tubular member 58 receives a spring 102 and a pair of washers 104 at opposite ends of the spring between the screw head 106 and the tubular member 58. Pressure is applied by the compressed spring 102 to press the tubular member 58 into whichever groove 92 or 94 it is nested so that it will not inadvertently move out of the groove, but an amount of deliberate moderate force will move it out of the groove. When the tubular member 58 is moved toward a groove, the compressive force of the spring 102 will cause it to "snap" into that groove. The amount of force holding the tubular member 58 in a groove may be adjusted by turning the screw 100 to increase or decrease the compressive force applied by the spring 102.

A bracket portion 108 extends upwardly from the rearward side of the block 90 between the groove 94 and the planar portion 76 to act as a "stop" to movement of the end of the tubular member 58 so that the tubular member 58 is prevented from being turned toward the direction, illustrated at 110, that wood is being cut. This stop 108 may, for example, have a height, width, and thickness of about 1/4 inch, 1/4 inch, and 1/8 inch respectively, and its rearward surface may be co-planar with the rearward surface of the block.

The inner end portion 112 of the ruler 52 is formed to have an increased diameter which is slightly less than the tubular member inner diameter over a short distance, for example, about 1/16 inch to prevent canting of the ruler so that it remains aligned with the tubular member. For example, the diameters of the ruler rod 52 and portion 112 may be about 3/16 inch and 5/16 inch respectively.

The terminal or outer end portion 114 of the tubular member 58 is threaded and threadedly receives a knurled cap 116. The cap 116 has an aperture 118 the diameter of which is slightly larger than the ruler rod diameter for receiving the ruler 52 so that the ruler remains aligned with the tubular member but so that the ruler is easily slidable therethrough. The enlarged portion 112 also prevents the ruler from being inadvertently entirely removed from the tubular member since it is prevented from passage through the cap aperture 118 and can therefore only be removed when the cap is removed.

Figure 6:
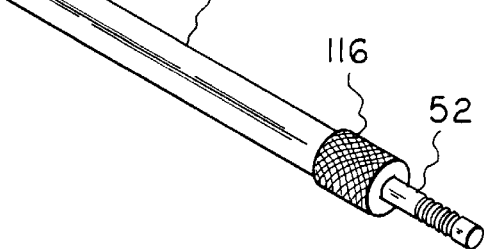
FIG. 6 is a sectional view taken along lines 6—6 of FIG. 4.

A pair of ferrules 120 and 122 are received on the ruler rod 52. The tubular member 58 has a reduced inner diameter over substantially its length so as to aid in maintaining alignment of the ruler rod 52 therewith. However, its terminal end portion has an increased inner diameter, which defines shoulder 140, for receiving ferrules 120 and 122, as hereinafter described. The axially inner ferrule 120 has an axially inner cylindrical portion 124 which is sized to be received in the tubular member 58 and an increased diameter axially outer cylindrical portion 126 which is too large to be received in the tubular member 58 whereby this portion 126 abuts the end of the tubular member 58. Ferrule 120 has an inside surface which has the shape of a truncated cone and is thereby shaped to provide a wedge-shaped annular space, illustrated at 132, between it and the ruler rod 52, ie, this space 132 decreases as the ferrule 120 extends axially inwardly. The axially outer ferrule is split longitudinally, as illustrated at 128. It has an axially inner portion 130 which is wedge-shaped to be complementary to the annular space 132 and which is wedgingly at least partially received in the annular space and sized to extend out of the axially outer end of ferrule 120. Its axially outer portion 134 is also wedge-shaped and slopes radially outwardly as it extends axially inwardly. As seen in FIG. 6, when the cap 116 is tightened onto the end of the tubular member 58, its end wall 136 presses on ferrule portion 134 and, due to the wedging action between portion 130 and ferrule 120, effecting a tendency to narrow the split 128 to thereby tend to decrease the diameter of ferrule 122 and accordingly tighten the ferrule 122 about ruler rod 52. As a result, the cap 116 may be tightened onto tubular member 58 to tightly secure the ruler 52 at a desired position for a specific measurement. For changing the ruler position, the cap 116 may be loosened to release the grip of the ferrule 122 on the ruler 52. Thus, desirably, the cap 116 need not be removed for changing the ruler position.

The screw 100 and the spring 102 may be made of stainless steel or other suitable material which is preferably non-rustable, and the remaining parts of the attachment 50 may be made of aluminum or other suitable material which is preferably non-rustable.

Figure 7:
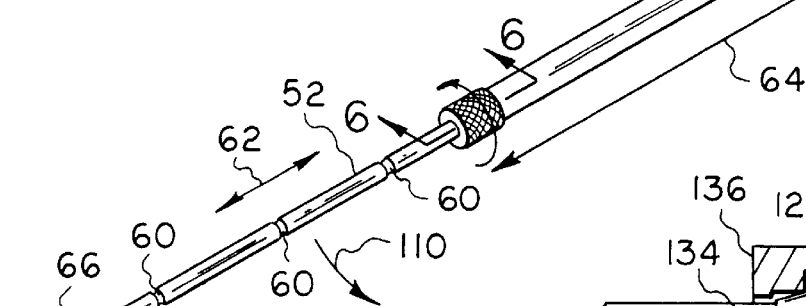
FIG. 7 is a perspective view of an alternative embodiment of the attachment.
Figure 7:
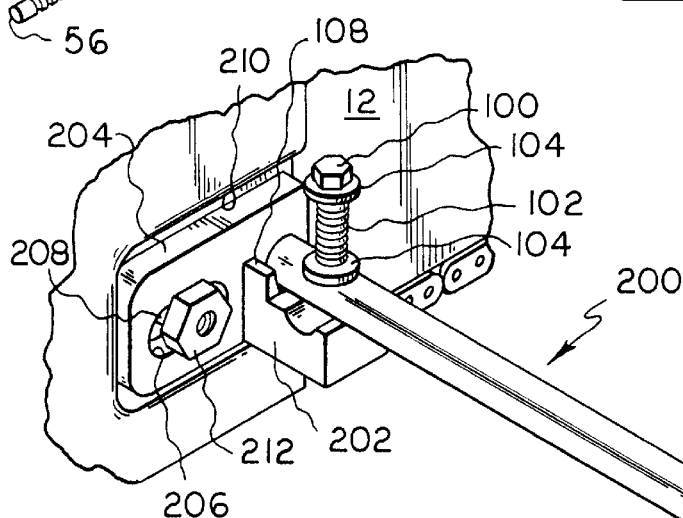

Referring to FIG. 7, there is illustrated generally at 200 a chain saw attachment in accordance with an alternative embodiment of the present invention wherein the chain saw housing 12 has only one stud 208 available for connecting the attachment 200. Attachment 200 includes a bracket 202 which is similar to bracket 68 except that its planar portion 204 is shorter and includes a shorter slot 206 for accommodating the single housing stud 208 for attachment of the bracket 202 to the housing 12. The planar portion 204 is sized to be received within the housing recess 210 with minimal clearance between it and the forward and rear edge walls of the recess 210 (or otherwise suitable minimal clearance with edge walls of the recess 210) so that the edge walls of the recess 210 restrain an otherwise tendency of the bracket 202 to undesirably rotate about the stud 208. The nut 212 is suitably sized and shaped to threadedly receive the stud 208.

Although the invention has been described in detail herein, it should be understood that the invention can be embodied otherwise without departing from the principles thereof, and such other embodiments are meant to come within the scope of the present invention as defined in the appended claims.

What is claimed is:

1. A ruler attachment device for a chain saw having a housing and at least one stud extending from the housing, the device comprising a tubular member, a ruler, means for telescopingly receiving said ruler in said tubular member, means including a bracket for mounting said tubular member to the chain saw housing, means for engaging the at least one chain saw stud for attaching said bracket to the chain saw housing, means for preventing rotation of said bracket relative to the at least one chain saw stud in the event that said engaging means loosens, and means for attaching said tubular member to said bracket so that said tubular member pivots relative to said bracket between a first position in which said tubular member is normal to the chain saw housing for measuring length of wood being cut with the chain saw and a second position in which said tubular member lies alongside the chain saw housing.

2. A device according to claim 1 wherein said rotation preventing means includes means for engaging an other chain saw stud for attaching said bracket to the chain saw housing.

3. A device according to claim 1 further comprising means for securely setting a ruler position relative to said tubular member for a desired measurement length.

4. A device according to claim 1 further comprising means for aligning the ruler relative to said tubular member.

5. A device according to claim 1 further comprising means comprising an upstanding portion of said bracket for stopping said tubular member from pivoting beyond said first position.

6. A device according to claim 1 wherein said ruler comprises a single elongate member telescopingly receivable in said tubular member.

7. A ruler attachment device for a chain saw having a housing and at least one stud extending from the housing, the device comprising a tubular member, a ruler, means for telescopingly receiving said ruler in said tubular member, means including a bracket for mounting said tubular member to the chain saw housing means for engaging the at least one chain saw stud for attaching said bracket to the chain saw housing means for attaching said tubular member to said bracket so that said tubular member pivots relative to said bracket between a first position in which said tubular member is normal to the chain saw housing for measuring length of wood being cut with the chain saw and a second position in which said tubular member lies alongside the chain saw housing, said engaging means includes means defining a slot in said bracket, a nut having a shank portion sized to extend through said slot means and threadedly engage said stud and a head portion sized to be stopped from passing through said slot means, and a washer disposed between said bracket and the housing and sized for disposing said bracket out of engagement with the housing.

8. A combination according to claim 7 further comprising means for preventing rotation of said bracket relative to the at least one chain saw stud in the event that said nut loosens.

9. A ruler attachment device for a chain saw having a housing and a cutting blade extending forwardly of the housing, the device comprising a tubular member, a ruler, means for telescopingly receiving said ruler in said tubular member, means including a bracket for mounting said tubular member to the chain saw housing, means for attaching said tubular member to said bracket so that said tubular member pivots relative to said bracket between a first position in which said tubular member is normal to the chain saw housing for measuring length of wood being cut with the chain saw and a second position in which said tubular member lies alongside the chain saw housing and extends rearwardly thereof, and means comprising an upstanding portion of said bracket for stopping said tubular member from pivoting beyond said first position.

10. A device according to claim 9 wherein said tubular member attaching means includes a pair of intersecting grooves in an upper surface of said bracket for receiving an end portion of said tubular member in said first and second positions respectively and spring means for urging said tubular member into said grooves.

11. A device according to claim 10 wherein said spring means comprises aperture means in said tubular member at an intersection of said grooves, a screw having a head and threadedly received in said aperture means, and a spring disposed between said tubular member and said screw head.

12. A device according to claim 9 wherein said ruler comprises a single elongate member telescopingly receivable in said tubular member.

13. A ruler attachment device for a chain saw having a housing, the device comprising a tubular member, a ruler comprising a single elongate member telescopingly receivable in said tubular member, means including a bracket for mounting said tubular member to the chain saw housing, means for attaching said tubular member to said bracket so that said tubular member pivots relative to said bracket between a first position in which said tubular member is normal to the chain saw housing for measuring length of wood being cut with the chain saw and a second position in which said tubular member lies alongside the chain saw housing, and means for securely setting a ruler position relative to said tubular member for a desired measurement length, said setting means including a first elongate ferrule in which said ruler is received, means defining a split longitudinally of said first ferrule for effecting a reduced diameter of said first ferrule for tightly engaging said ruler, a second ferrule in which said ruler is received and having a first portion received in said tubular member and a second portion which is stopped from being received in said tubular member, means for wedgingly partially receiving said first ferrule in said second ferrule, and cap means receivable on said tubular members and having an aperture for passage of said ruler for applying force to said first ferrule to wedgingly urge said first ferrule into said second ferrule to thereby effect a reduced diameter of said first ferrule.

14. A device according to claim 13 further comprising means for aligning the ruler relative to said tubular member, said aligning means comprising an enlarged inner end portion of said ruler.

15. A ruler attachment device for a chain saw having a housing, the device comprising a tubular member, a ruler comprising a single elongate member telescopingly receivable in said tubular member, means including a bracket for mounting said tubular member to the chain saw housing, means for attaching said tubular member to said bracket so that said tubular member pivots relative to said bracket between a first position in which said tubular member is normal to the chain saw housing for measuring length of wood being cut with the chain saw and a second position in which said tubular member lies alongside the chain saw housing, and means for aligning the ruler relative to said tubular member, said aligning means comprising an enlarged inner end portion of said ruler and further comprises a cap member threadedly receivable on a distal end portion of said tubular member and having aperture means sized for receiving said ruler.

16. In combination with a chain saw having a housing and a cutting blade extending forwardly of the housing, a ruler attachment device comprising a tubular member, a ruler, means for telescopingly receiving said ruler in said tubular member, means including a bracket for-mounting said tubular member to the chain saw housing, said bracket including a first portion attached to a side of the housing and a second portion extending laterally of the housing from said first portion, means for attaching said tubular member to said bracket second portion so that said tubular member pivots relative to said bracket between a first position in which said tubular member extends laterally of the chain saw housing from said second portion for measuring length of wood being cut with the chain saw and a second position in which said tubular member lies alongside the chain saw housing and extends rearwardly thereof, and means for limiting the pivotal movement of said tubular member to pivotal movement between said first and second positions.

17. A combination according to claim 16 wherein said pivotal movement limiting means comprises an upstanding portion of said second portion.

18. A combination according to claim 16 further comprising means for engaging at least one chain saw stud for attaching said bracket first portion to the chain saw housing.

19. A combination according to claim 18 further comprising means for preventing rotation of said bracket relative to the at least one chain saw stud in the event that said engaging means loosens.

20. A combination according to claim 19 wherein said pivotal movement limiting means comprises an upstanding portion of said second portion.

\* \* \* \* \*